United States Patent [19]

Yonezu

[11] 3,845,244

[45] Oct. 29, 1974

[54] SOUND SIGNAL CHANGING CIRCUIT

[75] Inventor: Hiroshi Yonezu, Tokushima-ken, Japan

[73] Assignee: Nippon Columbia Kabushikikaisha (Nippon Columbia Co., Ltd), Tokyo, Japan

[22] Filed: Aug. 1, 1972

[21] Appl. No.: 276,945

[30] Foreign Application Priority Data

Aug. 11, 1971 Japan .............................. 46-60802

[52] U.S. Cl. .............................................. 179/1 VC

[51] Int. Cl. .......................... H04r 27/00, H04r 3/00

[58] Field of Search ....... 179/1 VC, 100.1 VC, 1 D, 179/1 SW, 1 B; 340/148; 181/.5 SH

[56] References Cited

UNITED STATES PATENTS

| | | | |
|---|---|---|---|
| 1,888,467 | 11/1932 | Mueller | 179/1 D |
| 2,286,540 | 6/1942 | Hanson | 179/1 SW |
| 2,766,378 | 10/1956 | Sundin et al. | 179/1 SW |
| 3,224,115 | 12/1965 | Auernheimer | 179/1 B |
| 3,403,224 | 9/1968 | Schroeder | 179/1 |
| 3,518,375 | 6/1970 | Hawkins | 179/1 VC |
| 3,539,725 | 11/1970 | Hellwarth et al. | 179/1 D |

*Primary Examiner*—Kathleen H. Claffy
*Assistant Examiner*—Douglas W. Olms
*Attorney, Agent, or Firm*—Hill, Gross, Simpson, Van Santen, Steadman, Chiara & Simpson

[57] ABSTRACT

A sound signal changing circuit in which a sound signal component such as singing voice or the like contained in a signal reproduced from a pre-recorded tape, a record or the like is attenuated or removed and a sound signal from a microphone is inserted in the first-mentioned signal in place of the attenuated or removed signal component.

15 Claims, 16 Drawing Figures

FIG. 13
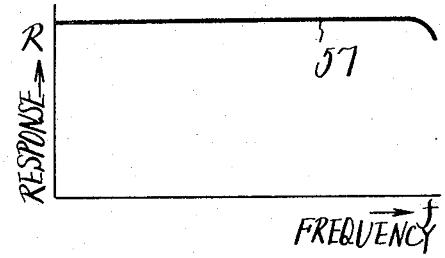
FIG. 8
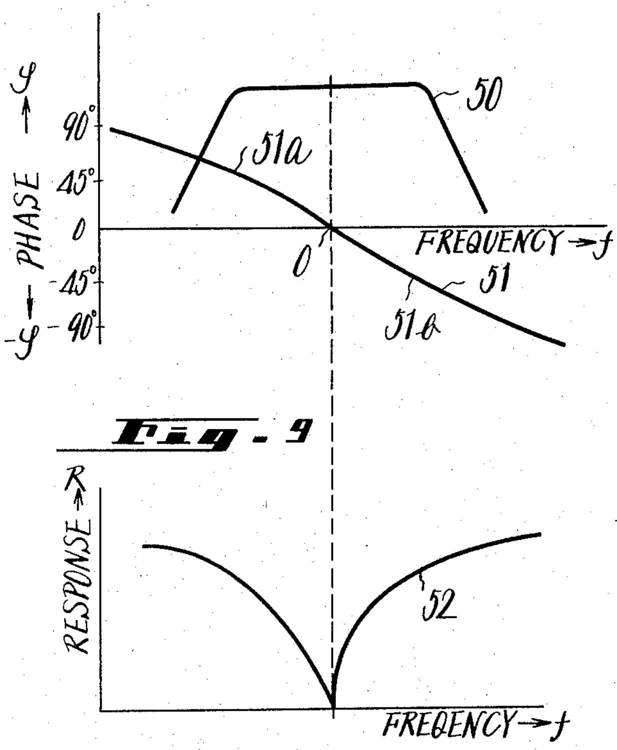
FIG. 8, FIG. 9
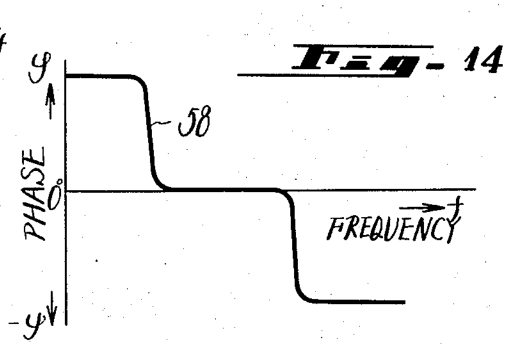
FIG. 14
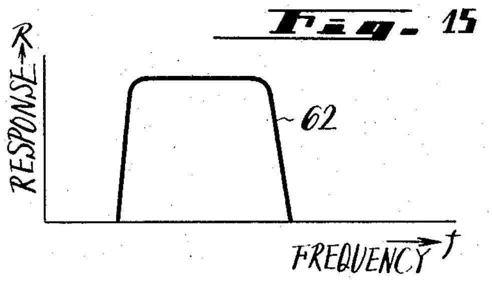
FIG. 15
FIG. 16
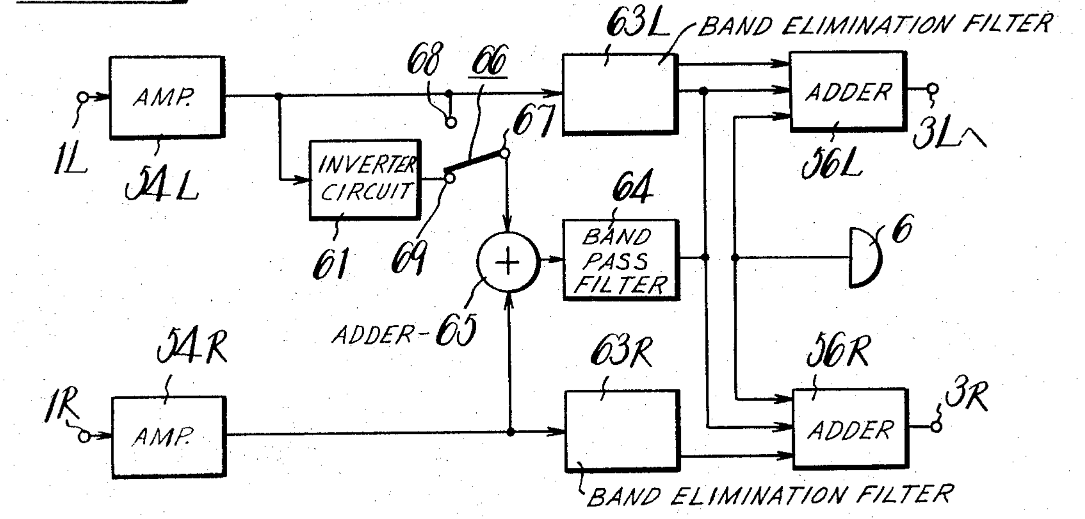

PATENTED OCT 29 1974 3,845,244

SHEET 6 OF 6

SOUND SIGNAL CHANGING CIRCUIT

BACKGROUND OF THE INVENTION

1. Field of the Invention

This invention relates a sound signal changing circuit in which a sound signal eliminating circuits consisting of a band pass filter, a low pass filter or the like and a mixing circuit for mixing a different sound signal with the output signal of the sound signal eliminating circuit are provided or in which a sound signal eliminating circuit for cancelling the stereosignals from a stereo-record in-phase and same in level and a mixing circuit for mixing a different sound signal with the output signal of the sound signal eliminating circuit are provided.

2. Description of the Prior Art

Means for removing noise signal components to make sound signals easy to hear has already been disclosed in the U.S. Pat. Nos. 3,057,960, 3,109,066 and so on. However, there has not been proposed such a sound signal changing circuit that only a singing voice recorded on a disc record or a pre-recorded tape together with an accompaniment is attenuated or removed and a singing voice of the user through a microphone can be inserted in place of the attenuated or removed singing voice originally recorded.

SUMMARY OF THE INVENTION

One object of this invention is to provide a sound signal changing circuit which is adapted so that only vocal sound signal component is removed or attenuated in the signal reproduced from a pre-recorded tape, a disc record or the like and a sound signal applied through a microphone or the like is mixed in place of the removed or attenuated vocal sound signal component.

Another object of this invention is to provide a sound signal changing circuit in which a sound signal removing circuit is automatically actuated upon application of a sound signal through a microphone or the like.

Another object of this invention is to provide a sound signal changing circuit which is adapted to prevent howling due to a microphone and a speaker.

Another object of this invention is to provide a sound signal changing circuit which is adapted to ensure actuation of a switching circuit.

Another object of this invention is to provide a sound signal changing circuit which is adapted so that a vocal sound signal is attenuated or removed in a signal component reproduced from a stereophonic record or the like and signals of the same phase and level to that of the vocal sound signal are cancelled by a sound signal removing circuit.

Still another object of this invention is to provide a sound signal changing circuit in which a switching circuit has a delay characteristic.

Other objects, features and advantages of this invention will become apparent from the following description taken in conjunction with the accompanying drawings.

BRIEF DESCRIPTION OF THE DRAWINGS

FIG. 8 is a graph showing the amplitude and phase characteristics of a phase shifter employed in the example of FIG. 7;

FIG. 9 is a graph showing the frequency-response characteristic of the phase shifter;

FIGS. 13 to 15, inclusive, are graphs showing the amplitude and phase characteristics of a phase shifter and a band-pass filter employed in the example of FIG. 12; and FIG. 16 is a system diagram of still another example of this invention.

DESCRIPTION OF THE PREFERRED EMBODIMENTS

With reference to FIGS. 1 to 16 embodiments of this invention will hereinafter be described in detail.

Figures 1, 2, 3, 4:
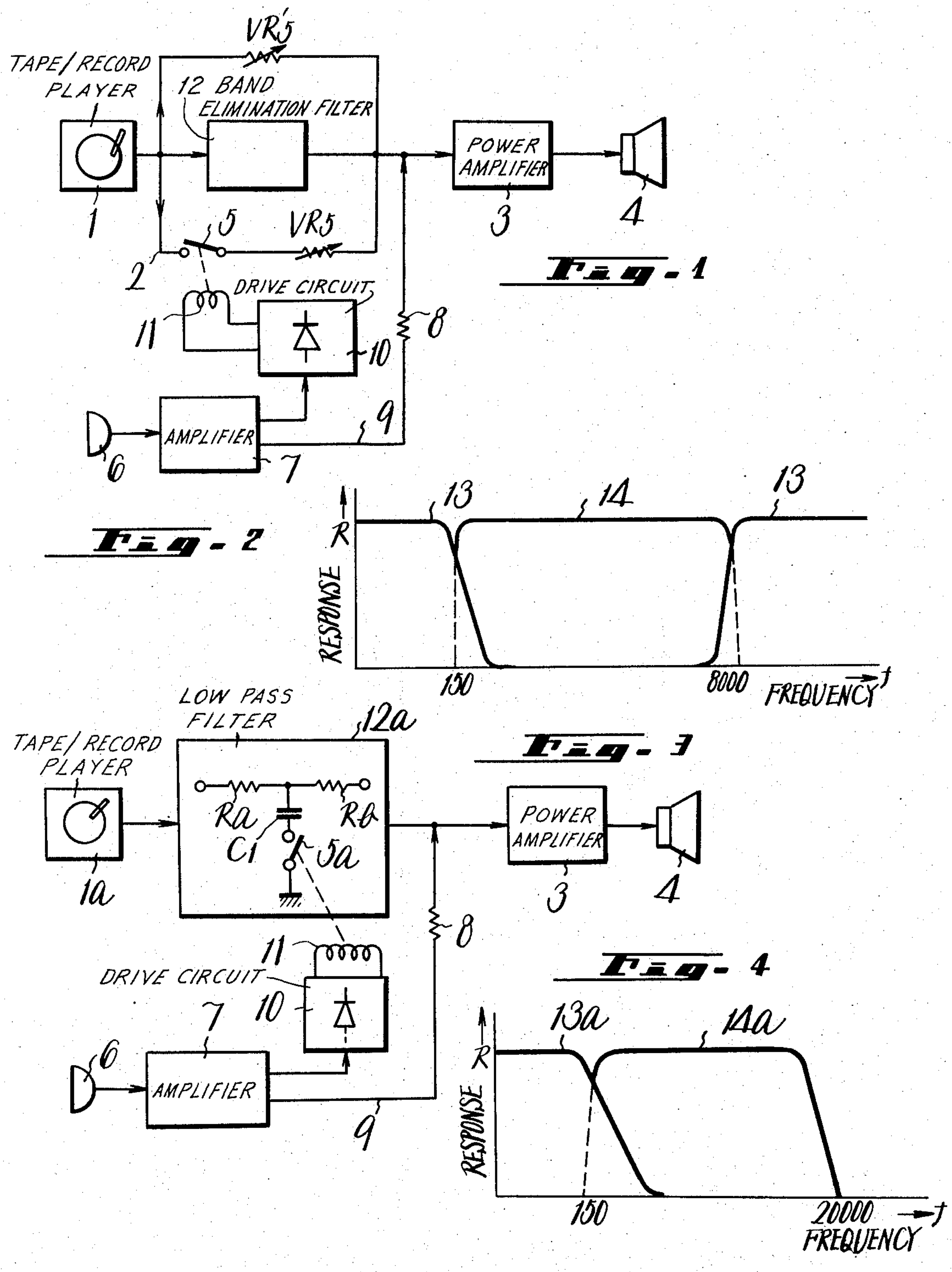
FIG. 1 is a system diagram of one example of this invention.
FIG. 2 is a graph showing the frequency characteristics of a band elimination filter and a microphone signal in FIG. 1.
FIG. 3 is a system diagram of another example of this invention.
FIG. 4 is a graph, similar to FIG. 2, showing the frequency characteristics of a low-pass filter and a microphone signal in FIG. 3.

In FIG. 1, reference numeral 1 indicates a tape recorder or a disc record player. An output signal component from a tape or a disc record is suitably amplified and, under normal conditions, the amplified output signal component is applied through a line 2 and a power amplifier 3 to a speaker 4, producing a sound therefrom.

The line 2 has incorporated therein a normally closed contact 5. Upon application of a sound signal from a microphone 6, the sound signal component is amplified by an amplifier 7 and the amplified component is supplied to the power amplifier 3 through a mixing resistor 8 of a line 9. While, one part of the output signal from the amplifier 7 is applied to a drive circuit 10. The drive circuit 10 energizes a solenoid 11 with a DC component having detected the signal component of the amplifier 7, turning off the normally closed contact 5. Thus, the signal component from the tape recorder or disc record player 1 is applied to a band elimination filter 12 in which a sound signal component is eliminated over a frequency range determined by a frequency limiting the band of the band eliminating filter and, as a result of this, an output such as shown in FIG. 2 which is mixed with the sound signal component from the microphone 6 is derived from the speaker 4. In FIG. 2, the abscissa represents frequency $f$ and ordinate response R and a curve 13 indicates the frequency characteristic of the band elimination filter 12 and a curve 14 that of the sound signal from the microphone 6. The limited frequency of the band elimination filter 12 is selected within the range of the sound signal. According to our various experiments, good results were obtained with a lower limit frequency of about 150Hz and an upper limit frequency of about 8,000Hz in the case of cutting off only man's voices but the upper limit frequency depends upon the conditions for eliminating recorded signals to be cut off. In the above case the signal from the tape or disc record is entirely eliminated but if the normally closed contact 5 of the line 2 is replaced with a variable resistor VR5 or if a variable resistor VR5' is connected in parallel with the band elimination filter 12, the signal from the tape or disc record can be attenuated by controlling the variable resistors VR5 or VR5'. In this case, it is a matter of course that the drive circuit 10 and the solenoid 11 are unnecessary.

Referring now to FIG. 3, another example of this invention will be described in detail. In the figure, parts corresponding to those in FIG. 1 are identified by the same reference numerals. Reference numeral 1*a* designates a signal source such as a TV signal component or a signal component including a sound signal of FM radio broadcast wave. In the present example, the band elimination filter 12 in FIG. 1 is replaced with a low-pass filter 12*a* and the low-pass filter 12*a* consists of two resistors $R_1$ and $R_2$ and a capacitor $C_1$, and the capacitor $C_1$ and the aforementioned relay contact 5 are interposed between the connection points of the series connection of the two resistors $R_1$ and $R_2$ and ground. The contact 5 is a normally open contact in this case.

With such an arrangement, the output signal from the signal source 1*a* such as a tape recorder or record player is somewhat attenuated by the resistors R*a* and R*b* and then applied to the power amplifier 3. Upon application of a sound to the microphone, the normally open contact 5*a* connected in series with the capacitor $C_1$ is turned on to constitute the low-pass filter 12*a*, by which the sound signal frequency range of the signal component from an imput signal 1*a* is cut off to provide a low frequency component 13*a* such as depicted in FIG. 4, which is applied to the power amplifier 3. At this time, a signal component 14*a* from the microphone 6 is mixed with the low frequency component 13*a*. In this case, the frequency band corresponding a mixed chorus is completely cut off, so that a user's sing through the microphone 6 is mixed with the musical signal.

Although the foregoing examples have been described to employ the band elimination filter 12 and the low-pass filter 12*a* respectively, these filters may be any type of filters so long as they attenuate or cut off signals of man's voice frequency components and a high-pass filter may be used therefor. It has been found that the use of the low-pass filter is simple and makes the reproduced sound appear natural to a listener. Further, the position of the connection of the filter is not so important and it may be disposed forwardly or rearwardly of any one of several stages of voltage amplifiers (not shown) located at the stage prior to the power amplifier 3. Connected to the stage prior to the voltage amplifier, the low-pass filter 12*a* is likely to pick up induced noise to produce hum but it does not matter if care is taken of in the shielding and in the arrangement of parts. Especially where an input signal from the tape recorder 1 or the like is great, substantially no induced noise is picked up. Further, the cut off frequency is selected lower than the lowest frequency of the man's voice and when the cutoff frequency is too low, the reproduced sound becomes unnatural and when it is too high, the sound signal from the input 1 is a little reproduced. Similarly, if the attenuation factor is too high, the reproduced sound becomes unnatural, so that the attenuation factor is usually selected to range about 6 to 12dB/oct. According to our experiments, it has been found that 12dB/oct is the best.

While the drive circuit 10 has been described to be automatically actuated by the output signal from the amplifier 7, it may also be actuated by hand. It is possible, of course, that a silicon controlled rectifier, a transistor or the like is used as the drive circuit while being gated.

Figure 5:
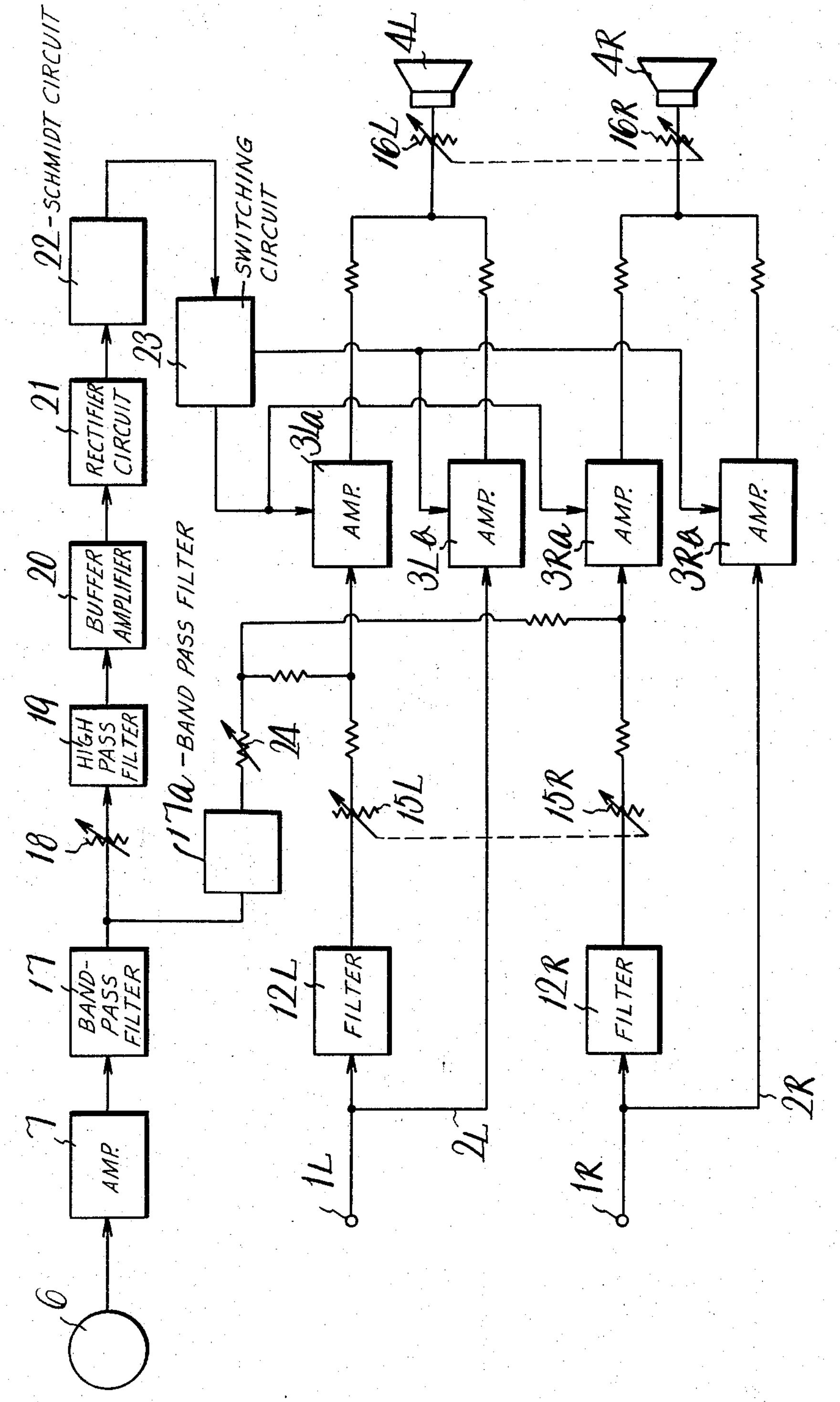
FIG. 5 is a system diagram of another example of this invention.

Turning now to FIG. 5, a further sound signal changing circuit of the invention will be described in detail which is capable of faithful reproduction of the mixed sound signals without generating howling. In the figure parts corresponding to those in FIG. 1 are marked with the same reference numerals. Reference numerals 1R and 1L designate input terminals supplied with, for example, stereo right and left signals from a pickup respectively. The input terminal 1L is connected to a speaker 4L through a line amplifier 3L*b* inserted in a line system 2L and, at the same time, it is connected to the speaker 4L through a band elimination filter 12L inhibiting the passage therethrough of the intermediate frequency (800 to 5,000Hz) component and through a line amplifier 3L*a*. Likewise, the input terminal 1R is connected to a speaker 4R through a line amplifier 3R*b* inserted in a line system 2R and, at the same time, it is connected to the speaker 4L through a band elimination filter 12R inhibiting the passage therethrough of the intermediate frequency component and through a line amplifier 3R*a*. Between the band elimination filter 12L and the line amplifier 3L*a* and between the band elimination filter 12R and the line amplifier 3R*a* variable resistors 15L and 15R connected respectively which are ganged with each other, and variable resistors 16L and 16R are provided in association with the speakers 4L and 4R respectively.

The output from the microphone 6 is supplied to a band-pass filter 17 through the amplifier 7. The band-pass filter 17 passes only the intermediate frequency component unlike the aforesaid band elimination filters 12L and 12R. The output of the band-pass filter 17 is applied through a variable resistor 24 to the line amplifiers 3L*a* and 3R*a* and through a variable resistor 18 to a high-pass filter 19 which is provided, if necessary, and permits the passage therethrough only of a high frequency component (higher than 3,000Hz). The output of the high-pass filter 19 is converted by a buffer amplifier 20 into a low impedance output, which is rectified by a rectifier circuit 21. With the output of the rectifier circuit 21, a Schmidt circuit 22 is actuated and a switching circuit 23 is actuated with the output of the Schimdt circuit 22. The switching circuit 23 consists of, for example, two NPN-type transistors having emitters grounded and is constructed so that either one of the transistors may be turned on with the output of the Schmidt circuit 22. The collector of the one transistor is connected to power source terminals of the aforesaid line amplifiers 3L*b* and 3R*b*, while the collector of the other transistor is connected to power source terminals of the aforementioned line amplifiers 3L*a* and 3R*a*. Namely, when no sound input is applied to the microphone 6 and consequently when no output is derived from the band-pass filter 17, the output of the Schmidt circuit 22 is at ground potential and the switching circuit 23 is in its normal condition and the power source terminals of the line amplifiers **3L*a* and 3R*a* are grounded. On the other hand, when an output is derived from the band-pass filter 17, the power source terminals of the line amplifiers 3L*b* and 3R*b* are grounded. Such a switching operation is achieved several seconds after the output of the Schmidt circuit 22** rises up to a high level.

With the construction described above, accompaniment is reproduced by the disc record player and then the reproduced signal is supplied to the input terminals 1L and 1R from the pickup. Where no input is applied to the microphone 6, the power source terminals of the line amplifiers **3L*a* and 3R*a* are grounded, so that the reproduced signals from the input terminals 1L and 1R are amplified by the line amplifiers 3L*b* and 3R*b* and supplied to the speakers 4L and 4R. When voices, by way of example, are applied to the microphone 6, a sound signal is derived at the output of the band-pass filter 17 and the sound signal is supplied as an input to the line amplifier 3L*a* and, at the same time, rectified and supplied to the Schmidt circuit 22. While, supplied with the rectified input, the Schmidt circuit 22 provides an output which lasts at high level and the switching circuit 23 is thereby actuated. As a result of this, the power source terminals of the line amplifiers 3L*b* and 3R*b* are rendered at the ground potential and, at the same time, the power source terminals of the line amplifiers 3L*a* and 3R*a* are put to a predetermined operative potential. Thus, the reproduced signals from the input terminals 1L and 1R, after having their intermediate frequency components removed, are mixed with the sound signal from the microphone 6 and amplified by the line amplifiers 3L*a* and 3R*a* and applied to the speakers 4L and 4R** to produce sounds that the accompaniment and vocal sound are mixed together. Of course, it is also possible to mix narration with background music.

With the above construction, since the speakers 4L and 4R and the microphone 6 are provided, it may be considered probable that howling occurs. However, occurrence of howling can be effectively prevented with the construction of this invention that the band-pass filter 17 is connected to the output of the microphone 6. Namely, when the signal derived from the pickup or the signal that this signal and the sound signal from the microphone 6 are mixed together is applied to the speakers 4L and 4R to produce sound, even if the produced sound is applied to the microphone 6, only the intermediate frequency component (800 to 5,000Hz) is supplied through the band-pass filter 17 to the speakers 4L and 4R, so that the low frequency component (mainly 500 to 800Hz) which is the cause of howling can be prevented from being applied to the speakers 4L and 4R. Especially, when the audio signal that the sound signal derived from the microphone 6 and that from the pickup are mixed together is applied to the speakers 4L and 4R to produce sound, the audio signal is complicated in frequency component and high in level, and consequently howling is likely to occur. Also in such a case, if howling occurs, it can be removed by making the microphone 6 inoperative momentarily or stopping supply of the sound momentarily. Thus, since the operation of the switching circuit 23 has a time constant of about several seconds, the signals from the input terminals 1L and 1R pass through the band elimination filters 12L and 12R for the period of several seconds to remove their intermediate frequency components and the signals are applied to the speakers 4L and 4R. Further, even if the sounds from the speakers 4L and 4R are applied to the microphone 6, the low frequency component likely to cause howling is removed by the band-pass filter 17, so that howling can be well prevented from occurrence.

Further, in the present invention, the high-pass filter 19 is provided, by which the switching circuit 23 is prevented from being actuated by frequency components lower than 3,000Hz, which is likely to cause howling. Accordingly, in this case, the output of the microphone 6 is not supplied to the speakers 4L and 4R, ensuring to avoid howling.

With the present invention, occurrence of howling can be prevented positively by the various howling preventive operations described above and, as a result of this, the signal that the reproduced signal from the record or the tape and the sound signal from the microphone 6 are mixed together can be faithfully reproduced through the speakers 4L and 4R. In the above example, it is also possible, of course, that a band-pass filter **17*a* is inserted in the mixing line at a stage prior to the variable resistor 24 separately or together with the band-pass filter 17** as indicated by a broken line.

The apparatus described above is defective in that clicks are heard from the speakers 4L and 4R at the time of change-over of the switching circuit 23. In addition, even if the sound input to the microphone 6 is momentarily interrupted, the switching circuit 23 often operates to produce clicks.

Figures 6, 7:
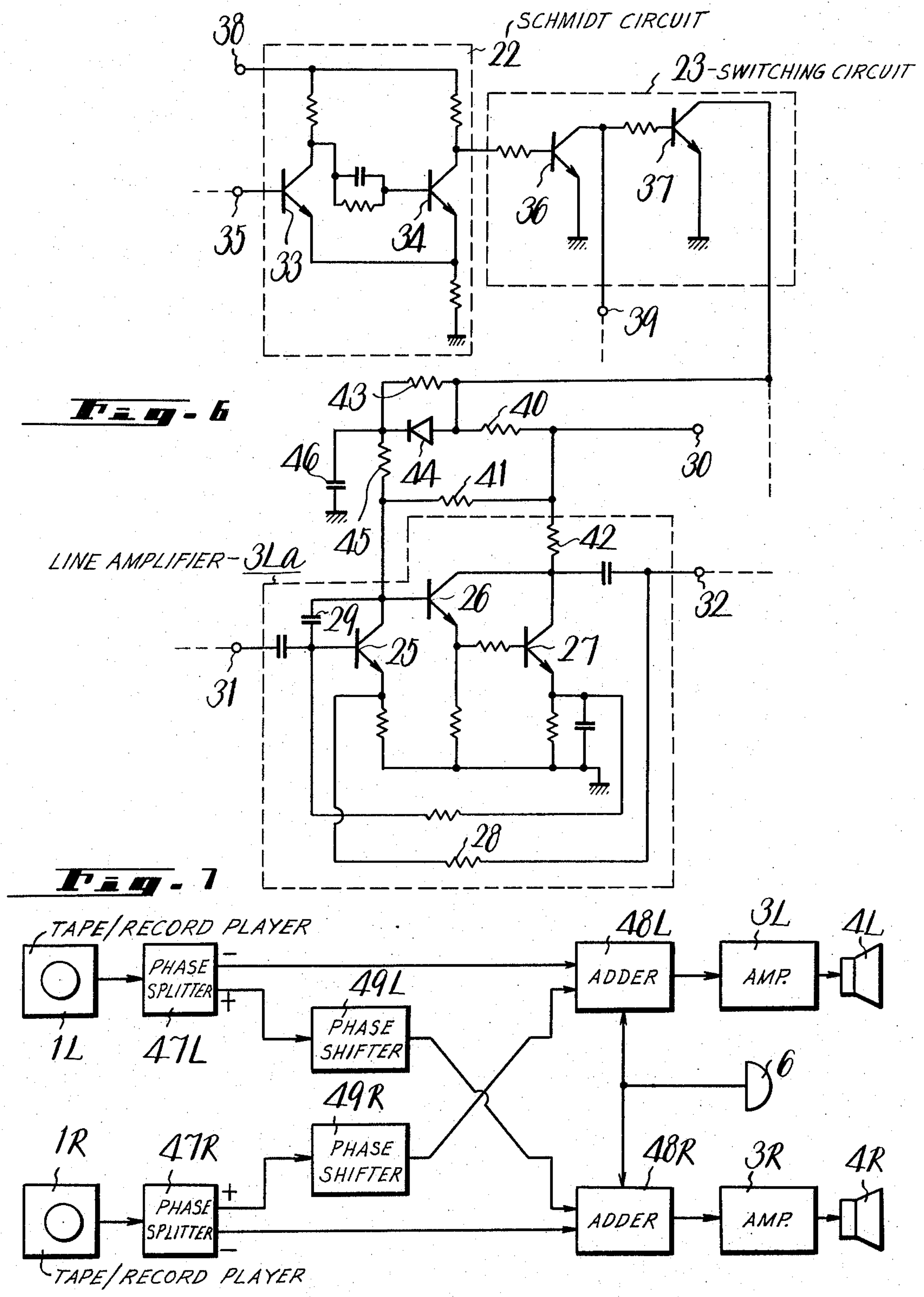
FIG. 6 is a circuit diagram, for explaining a delay circuit part in FIG. 5.
FIG. 7 is a system diagram of another example of this invention.

With reference to FIG. 6, another example of this invention will hereinafter be described in detail which is adapted so that the signal path is changed over by the switching circuit 23 a predetermined time after an output is derived from the microphone 6 to ensure effective prevention of clicks. The line amplifier **3L*a* is formed with, for example, NPN-type transistors 25, 26 and 27 directly coupled with each other and includes a negative feedback loop having inserted therein a resistor 28 and an oscillation preventive capacitor 29. Reference numeral 30 designates a power source terminal of the line amplifier 3L*a*, 31 an input terminal supplied with the output of the band elimination filter 12L and 32 an output terminal. The Schmidt circuit 22 is made up of NPN-type transistors 33 and 34 and its input terminal 35 is supplied with the output of the rectifier circuit 21. The output terminal of the Schmidt circuit 22 is connected through a resistor to the base of an NPN-type transistor 36 having its emitter grounded and the collector of the transistor 36 is connected through a resistor to the base of an NPN-type transistor 37. These transistors 36 and 37 constitute the switching circuit 23. Reference numeral 38 identifies a power source terminal of the Schmidt circuit 22**.

A terminal 39 connected to the collector of the transistor 36 of the switching circuit 23 is connected to power source terminals of the line amplifiers **3L*b* and 3R*b*, though not shown, while, the collector of the transistor 37 is connected through a resistor 40 to the power source terminal 30 of the line amplifier 3L*a*. Similarly, the collector of the transistor 37 is connected to a power source terminal of the line amplifier 3R*a*. The power source terminal 30 is connected through a resistor 41 to the collector of the transistor 25 of the line amplifier 3L*a* and, at the same time, to the collectors of the transistors 26 and 27 through a resistor 42**.

Further, the connection point of the collector of the transistor 37 of the aforesaid switching circuit 23 with the resistor 40 is grounded through a parallel circuit consisting of a resistor 43 and a diode 44 and a capacitor 46. The electrode of the capacitor 46 which is not grounded is connected to the collector of the transistor 25 through a resistor 45 and, at the same time, to the collectors of the transistors 26 and 27 through resistors 41 and 42.

With the arrangement described above, when no sound input is applied to the microphone 6, no input signal is applied to the Schmidt circuit 22, so that the transistor 33 of the Schmidt circuit 22 is turned off while the transistor 34 thereof is turned on. Consequently, the transistor 36 of the switching circuit 23 is turned off while the transistor 37 is turned on. Thus, the line amplifiers **3L*b* and 3R*b* are operative, while the line amplifiers 3L*a* and 3R*a*** have their power source terminals grounded, and hence are inoperative.

Upon application of a sound to the microphone 6, the on and off states of the transistors 33 and 34 of the Schmidt circuit 22 are inverted to turn on the transistor 36 and off the transistor 37. Then, the capacitor 46 is charged by the DC current from the power source terminal 30. The charging time constant at this time is substantially determined by the resistor 40 and the capacitor 46. Accordingly, the line amplifier **3L*a* is put in its operative condition after a predetermined period of time determined by the charging time constant after the application of the sound to the microphone 6. Thus, the line amplifier 3L*a* is altered from its inoperative condition to its operative condition with a predetermined time after changing over the Schmidt circuit 22 and the switching circuit 23,** so that clicks are not reproduced through the speakers.

On the contrary, when the supply of sound to the microphone 6 is interrupted, the transistor 36 of the switching circuit 23 is turned off and the transistor 37 is turned on. Accordingly, the power source terminal 30 is grounded, but charge stored in the capacitor 46 is discharged through the resistor 43. The discharge time constant is substantially determined by the resistor 43 and the capacitor 46. Also in the case where the line amplifier **3L*a* is altered from its operative condition to its inoperative one, it becomes inoperative with a predetermined period of time after no output is derived from the microphone 6,** so that no clicks are produced through the speakers.

Although the power source terminal 30 is connected through the resistors 41 and 42 to the collectors of the transistors 25, 26 and 27, this is a loop for the so-called preheating for flowing a preliminary current to the transistors by the fact that the resistance values of the resistors 41 and 42 are selected great enough to cut off the transistors. It may be also possible to construct the resistors 41 and 42 as variable resistors and select the charge and discharge time constants suitable. Of course, the line amplifiers **3R*a*, 3L*b* and eR*b* except the line amplifier 3L*a*, which are controlled by the switching circuit 23** to be operative or inoperative, are also similarly constructed.

Thus, the present invention provides an apparatus that no uncomfortable clicks are produced through the speakers 4L and 4R when the line amplifiers **3L*b*, 3R*b* or 3L*a*, 3R*a* are changed over in accordance with the presence or absence of the output from the microphone 6. Especially, even if the output of the microphone 6 is momentarily interrupted, for example, during narration, the line amplifier is held in its controlled condition for a predetermined time period, for example, 1 to 2 seconds, so that it is possible to reproduce faithfully the audio signal that the voice and the reproduced signal from the input terminals 1L and 1R** are mixed together.

With such voice suppressing means, the signal component of a musical sound of a musical instrument other than the voice is also removed according to the selection of the band frequency of the band elimination filter and faithful reproduction is impossible and, in addition, the overall circuit construction is complicated.

With reference to FIGS. 7 to 17, sound suppression circuits will hereinbelow be described which are free from the above defects and novel in construction. In stereophonic reproducing apparatus, when a stereo signal of musical instruements containing vocal signal is recorded on a record or tape, in order to locate the vocal signal and the signal of the musical instruments at a proper position, they are mixed with each other with a predetermined level and phase. This will be specifically described with reference to right and left channels of the stereophonic reproducing apparatus. In order to direct the vocal sound signal at the center between right and left speakers, the vocal sound signal must be applied to the right and left channels in the same phase and at the same level. Sounds of rhythm instruments and other melody instruments are suitably spread out to right and left from the center. (In the case of two channels, the phase does not matter, so that the sound signals are processed as in-phase between the two channels.)

Thus, the stereo signal containing a vocal signal from the musical instruments is reproduced with a stereophonic effect as if the sound of each musical instrument is disposed stereophonically. This invention is to remove only a specific sound positioned between the right and left signals recorded on a record or a prerecorded tape with minimum influence on the other musical sounds in the playback system. In FIG. 7, elements corresponding to those in FIG. 5 are identified by the same reference numerals and no detailed description will be repeated. First signal components recorded on a record or a pre-recorded tape in a manner to be positioned centrally and supplied to the input terminals 1L and 1R are applied to phase spliters 47L and 47R to provide outputs of opposite phases respectively. The negative phase components (−) from the phase spliters 47L and 47R are applied to adders 48L and 48R and the in-phase components (+) are also fed to the adders 48R and 48L but through phase shifters 49L and 49R. A vocal sound signal component desired to be mixed with the first signal components is applied to the respective adders 48L and 48R from the microphone 6, so that while the microphone 6 is operative, sound having the vocal sound signal component mixed in the band that a vocal sound signal reproduced from the record or the pre-recorded tape is suppressed can be reproduced from the speakers 4L and 4R through the power amplifiers 3L and 3R.

The frequency-phase and amplitude characteristics of the above-mentioned phase shifters 49R and 49L are selected as shown in FIG. 8. As will be apparent from the phase characteristic curve 50 showing the amplitude characteristic between the inputs and outputs of the phase shifters 49R and 49L, the outputs of the phase shifters 49R and 49L are completely opposite in phase to each other at the point of the phase shift being zero, so that if their levels are exactly equal to each other, the amount of amplitude is zero and their elimination characteristics are such as indicated by a curve 52 in FIG. 9.

If the left and right output signals are taken as Lout and Rout respectively, the following equations hold:

$$Lout = L - R(\phi)$$

$$Rout = R - L(\phi)$$

where L and R are left and right input signals and $R(\phi)$ and $L(\phi)$ functions determined by the phase characteristics of the phase shifters.

Figures 10, 12:
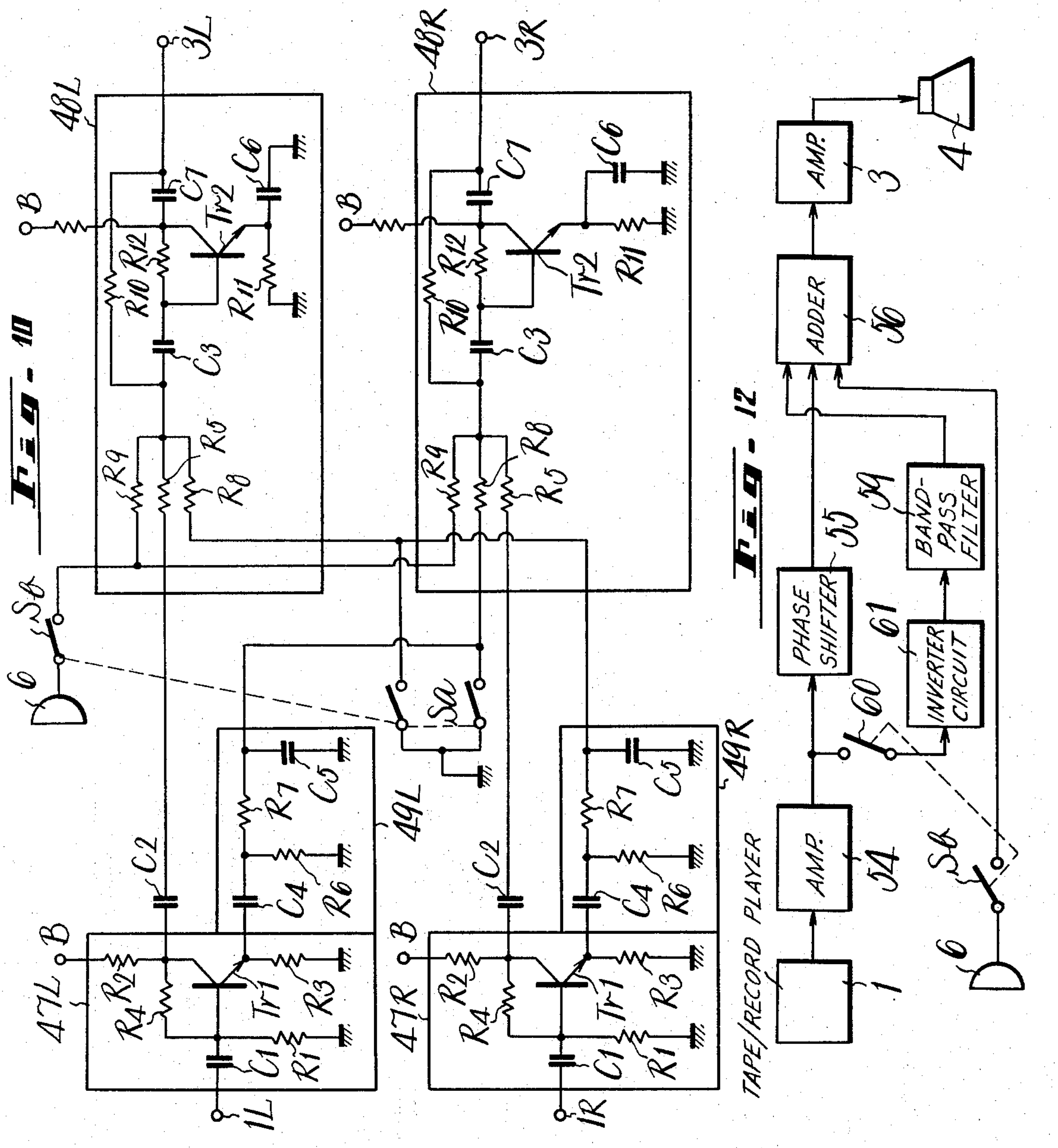
FIG. 10 is a circuit diagram showing one example of the concrete circuit construction used in the example of FIG. 7.
FIG. 12 is a system diagram of another example of this invention.

FIG. 10 is a concrete circuit diagram of the example depicted in FIG. 7. The input terminals 1L and 1R are connected to the bases of transistors $Tr_1$ of the phase spliters 47L and 47R through coupling capacitors $C_1$ respectively. Reference characters $R_1$ and $R_4$ designate base resistors, $R_3$ emitter resistors, $R_2$ load resistors and B B voltage sources. The collectors of the transistors $Tr_1$ are connected to the bases of amplifying transistors $Tr_2$ through coupling capacitors $C_2$ and $C_3$ and mixing resistors $R_5$ respectively. Further, filters each consisting of a capacitor $C_4$ and a resistor $R_6$ and having such a phase characteristic 51*a* in FIG. 8 that an emitter output of each transistor $Tr_1$ opposite in phase to its collector output is converged from +90° to 0° and filters each consisting of a resistor $R_7$ and a capacitor $C_5$ and having such a phase characteristic 51*b* in FIG. 8 that the above-mentioned emitter output is converged from −90° to 0° are connected in series to each other, providing the phase shifters 49L and 49R. The outputs of the phase shifters 49L and 49R are applied to opposite site side adders 48R and 48L through resistors $R_8$ respectively. The aforesaid resistors $R_5$ and $R_8$ and those $R_9$ for mixing the output signal from the microphone 6 are connected to the bases of the transistors $Tr_2$ in parallel to each other, by which added outputs determined by the ratios of the above resistors to those $R_{10}$ connected between the bases and collectors of the transistors $Tr_2$ can be derived at output ends.

Reference character $C_6$ indicates by-pass capacitors, $R_{11}$ emitter resistors, $R_{12}$ base resistors and $C_7$ coupling capacitors. Reference character S*a* designates a switch for making this circuit inoperative, which is preferred to be ganged with a microphone switch S*b*.

Figure 11:
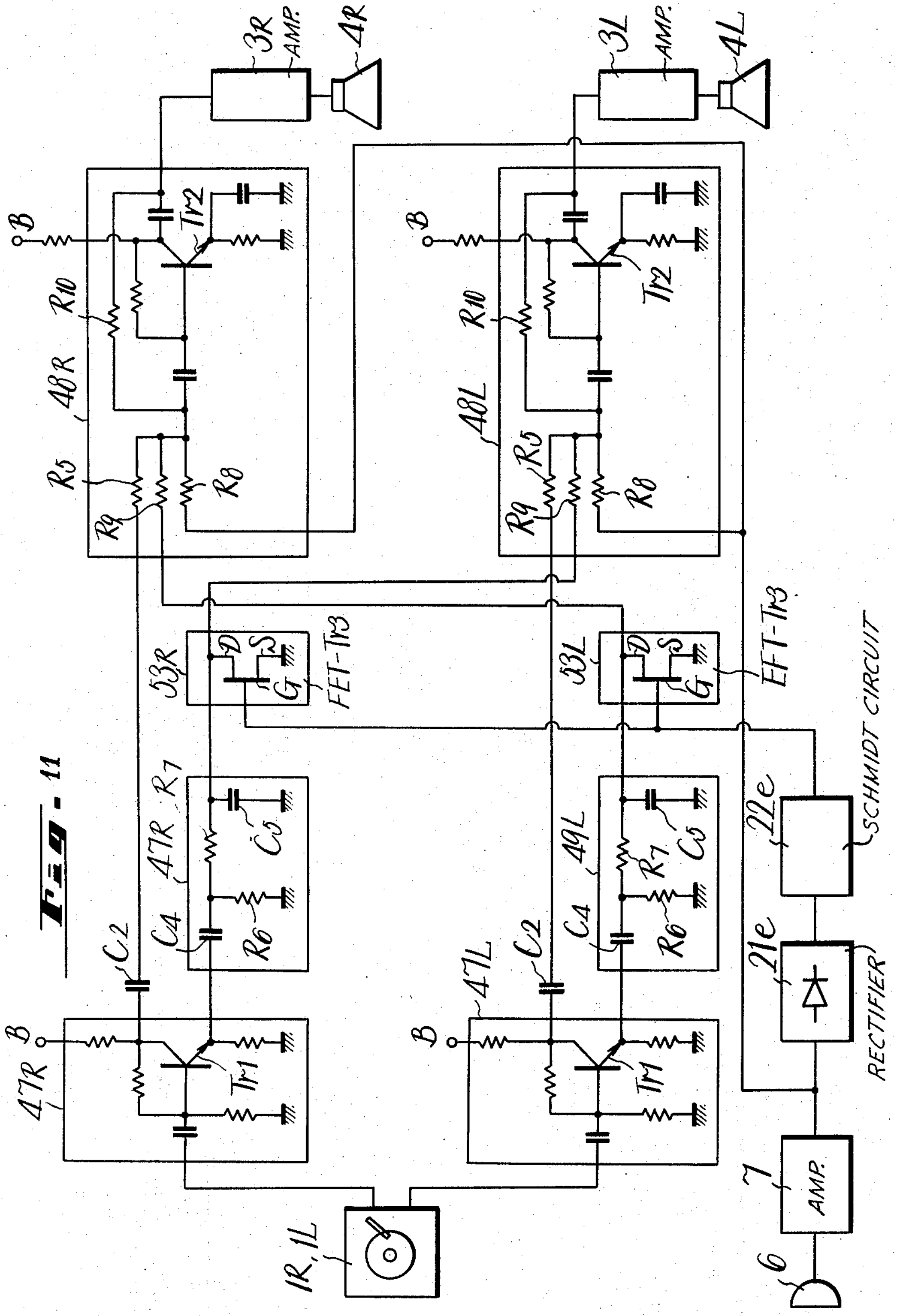
FIG. 11 is a circuit diagram illustrating another example of the circuit construction of the example of FIG. 10.

In FIG. 11 there is illustrated an example in which the switch S*a* ganged with that S*a* of the microphone 6 in FIG. 10 is formed with a field effect transistor FET-$Tr_3$. The parts corresponding to those in FIG. 10 are marked with the same reference numerals and characters and no detailed description will be given. The signals derived from the left and right phase shifters 49L and 49R are applied to left and right gate circuits 53L and 53R respectively. Each of the gate circuits 53L and 53R may be formed with the field effect transistor FET-$Tr_3$ and the output signal of each phase shifter is applied to the drain D of the field effect transistor FET-$Tr_3$, the source S of which is grounded and the gate G of which is supplied with a drive pulse from the microphone 6. The outputs of the left and right gate circuits 53L and 53R are applied to left and right mixing circuits 48L and 48R so that they may be mixed with opposite signals.

While, the signal component from the microphone 6 is applied to the mixing resistors $R_8$ after suitably amplified by the amplifier 7. One part of the amplified signal component is, for example, envelope-detected by a detector circuit 21*e* and shaped by a waveform shaping circuit 22*e*, so that a gate waveform may be obtained when a vocal sound signal is applied to the microphone 6. The gate waveform thus obtained is applied to the gates of the field effect transistors FET-$Tr_3$.

The operation of the circuit constructed as described above will be described. Under normal conditions that the microphone 6 is held inoperative, the signal components derived from the collectors of the transistors of the left and right phase spliters are fed through the left and right mixing circuits and the left and right power amplifiers 3L and 3R to the left and right speakers 4L and 4R, producing sound therefrom.

In this case, since no vocal sound signal is derived from the microphone 6, the resistance between the sourse S and drain D of the field effect transistor FET-$Tr_3$ of each gate circuit is low. Accordingly, if the impedance on the side of each phase shifter is selected higher than the resistance between the source S and drain D, the signals from the phase shifters 49R and 49L are cut off.

When a vocal sound signal component is derived from the microphone 6, it is amplified by the amplifier 7 and mixed in the mixing resistor $R_8$. The signals reproduced from the record or the tape and applied through the input terminals 1L and 1R are converted into signals of opposite phases by the phase spliters and their output signals are applied to the gate circuits 53L and 53R. However, since the gate of the field effect transistors FET-$Tr_3$ of each gate circuit is supplied with a gate pulse which is produced by detecting and shaping the vocal sound signal, the resistance between the drain D and source S of the field effect transistor is high and the output of each phase shifter is gated.

The same is true of the left signal component, so that only the vocal sound signal is removed or suppressed but the signal component of the sound of the musical instrument within the band of the vocal sound signal is not removed or suppressed, as in the case of employing the band elimination filter.

In FIG. 12 there is shown another example of this invention which is adapted to attain the same object as that in the example of FIG. 11. In the figure, elements corresponding to those in FIG. 11 are identified by the same reference numerals and characters and no detailed description will be repeated.

The signal component from a record or a prerecorded tape 1 is amplified by an ordinary amplifier 54 and applied to the speaker 4 through a phase shifter 55, an adder 56 and the power amplifier 3, producing sound. The frequency-amplitude characteristic of the phase shifter 55 is selected substantially flat in an audible frequency range as indicated by a curve 57 in FIG. 13 and the frequency-phase characteristic is selected equal to the phase characteristic of a band-pass filter 59 described later, as indicated by a curve 58 in FIG. 14. Further, the adder 56 is so constructed as to be determined by a constant ratio of a resistor connected between the collector and base of one amplifying transistor with a mixing resistor connected to the base of the amplifying transistor, as is the case with the circuits indicated by 48R and 48L in FIG. 11.

By turning on the normally open switch $Sb$ associated with the microphone 6, a normally open switch 60 which is ganged with the switch $Sb$ and connected to the output end shunted from the amplifier 54 is turned on.

To the normally open switch 60 are connected an inverter circuit 61 to which a band-pass filter 59 is connected to achieve an additive operation with the aforementioned adder 56. The frequency-amplitude characteristic of the band-pass filter 59 is selected to permit the passage therethrough of a certain band, for example, only the vocal signal component, as indicated by a curve 62 in FIG. 15. Further, its frequency-phase characteristic is selected to be flat in a certain band like the amplitude characteristic, indicated by a curve 58 in FIG. 14. Consequently, only the vocal component contained in the signal component from the record and contained from the output of the amplifier 54 and inverted by the inverter circuit 61 is permitted to pass through the band-pass filter 59 but since this component is inverted by the inverter circuit when applied to the adder, it is subtracted relative to a similar vocal component applied through the phase shifter and they are cancelled with each other and the vocal sound signal component, for example, a singing voice, from the microphone 6 is superimposed in the band in which the above-mentioned components have been cancelled with each other. In this case, since the phase characteristic of the phase shifter 55 is selected flat only in the band of the vocal signal component, the other signal components of the musical instruments or the like in the band are not cancelled and can be reproduced through the speaker 4. Accordingly, only the vocal component can be faithfully attenuated or removed.

Turning now to FIG. 16, another example of this invention will be described, in which similar references designate similar components and stereophonic signals are only handled and the frequency-phase characteristic is not discussed unlike in the above example.

The output signal components are applied to the input terminals 1L and 1R and then fed to the power amplifiers 3L and 3R through ordinary amplifiers 54L and 54R, band elimination filters 63L and 63R and adders 56L and 56R respectively.

One part of the left signal is applied to an adder 65 through the inverter circuit 61, a fixed contact 69 of a switch 66 and its movable contact 67 and one part of the right signal is also fed to the adder 65. Further, a fixed contact 68 of the switch 66 is directly connected from the left signal path so that when the movable contact 67 is turned down to the side of the fixed contact 68, the left signal component is directly applied to the adder 65.

The output of the adder 65 is applied to a band-pass filter 64, the output of which is fed to the left and right adders 56L and 56R.

As is the case with the example of FIG. 12, the signal component from the microphone 6 is added to the aforesaid adders 56L and 56R.

The band elimination filters 63L and 63R have the same amplitude characteristic as indicated by the curve 13 in FIG. 2 and the band-pass filter 64 has also such an amplitude characteristic as indicated by a curve 62 in FIG. 15.

If the pass and elimination bands of the band-pass filter 64 and the band elimination filters 63L and 63R are selected to correspond to, for example, the vocal signal band, since the movable contact 67 of the switch 66 is turned down to the side of the fixed contact 68 under normal conditions that no mixing is carried out, the vocal signal having passed through the band-pass filter 64 is superimposed by the adders 56L and 56R in the band removed by the band elimination filters 63L and 63R and, as a result of this, signals within the entire audible frequency band are reproduced through the speakers.

When a vocal signal to be mixed is applied through the microphone 6, the movable contact 67 of the switch 66 is automatically or manually changed over to the side of the fixed contact 69 and the left signal component is inverted by the inverter circuit 61 and applied to the adder, so that it is cancelled with the right signal component and no vocal components in the left and right signal components are derived from the output of the band-pass filter. Consequently, the vocal component from the microphone 6 is mixed by the adders 56L and 56R in the band from which the vocal components in the left and right signal components are removed or attenuated by the band elimination filters 63L and 63R.

This invention is featured in that even if a specific band is removed and mixing is achieved as described above, relatively faithful reproduction is possible.

The foregoing examples have been described in connection with the case where man's vocal sound signal component is removed or attenuated from a sound signal frequency component and another man's vocal sound signal is mixed but since only man's voice can be picked up by using a band-pass filter in place of the band elimination filter, the sound signal components of musical instruments can be removed or attenuated. Accordingly, sound signals of other musical instruments can also be mixed very easily.

It will be apparent that many modifications and variations may be effected without departing from the scope of the novel concepts of this invention.

I claim:

1. A circuit for eliminating a selected band of audio frequencies from an audio spectrum and inserting another audio signal into said selected band comprising, an input terminal receiving an audio signal, a band elimination filter connected to said input terminal and removing a selected band of audio frequencies from said audio signal, an intermittent source of audio signals having frequency components in said selected band, a rectifier connected to said intermittent source to develop a control signal when said intermittent signal is present, a solenoid connected to said rectifier, a switch connected in parallel with said band elimination filter and controlled by said solenoid so that said switch is open in the presence of said intermittent signal and a speaker connected to said intermittent source of audio signals and to the output of said band elimination filter.

2. A circuit according to claim 1 including a first resistor in parallel with said band elimination filter.

3. A circuit according to claim 2 including a second resistor in series between said speaker and said source of intermittent signals.

4. A circuit for eliminating a selected band of audio frequencies from an audio spectrum and inserting another audio signal into said selected band comprising, an input terminal receiving an audio signal, a low pass filter connected to said input terminal and removing a selected portion of audio frequencies from said audio signal, an intermittent source of audio signals having frequency components in said selected band, a rectifier connected to said intermittent source to develop a control signal when said intermittent signal is present, a solenoid connected to said rectifier, said low pass filter comprising a pair of series-connected resistors and a capacitor, a switch connected between said capacitor and ground, and controlled by said solenoid so that said switch is open in the presence of said intermittent signal, and a speaker connected to said intermittent source of audio signals and to the output of said low pass filter.

5. A circuit for eliminating a band of audio frequencies from a stereophonic audio signal and inserting an intermittent audio signal comprising, a left audio signal input terminal, a right audio signal input terminal, a pair of band elimination filters respectively connected to said left and right audio signal input terminals, first, second, third and fourth switchable amplifiers with the first and third respectively receiving the outputs of said pair of band elimination filters and the second and fourth respectively connected to said left and right audio signal input terminals, a left speaker connected to the outputs of said first and second switchable amplifiers, a right speaker connected to the outputs of said third and fourth switchable amplifiers, a switching circuit connected to said source of intermittent audio signal and connected to said first and third switchable amplifiers, a rectifier circuit receiving a portion of said intermittent audio signal to develop a control signal, the output of said rectifier circuit connected to said switching circuit such that said first and third switchable amplifiers pass signals when an intermittent audio signal is present and said second and fourth switchable amplifiers pass signals when said intermittent signal is abscent.

6. A circuit according to claim 5 including a high pass filter between said source of intermittent signals and said rectifier circuit.

7. A circuit according to claim 5 including a Schmidt circuit connected between said rectifier circuit and said switching circuit.

8. A sound signal changing circuit according to claim 1, wherein the band elimination filter is a high-pass filter.

9. A sound signal changing circuit according to claim 2, wherein said first resistor is variable.

10. A sound signal changing circuit according to claim 1, wherein said selected band of audio frequencies to be removed from said audio signal is a man's vocal sound signal component.

11. A sound signal changing circuit according to claim 1, wherein said selected band of audio frequencies to be removed from said audio signal is a sound signal component of a musical instrument.

12. A sound signal changing circuit according to claim 1, including an amplifier connected between said rectifier and said intermittent source of audio signal.

13. A sound signal changing circuit according to claim 11, wherein said amplifier has a band pass response signal path for preventing howling.

14. A circuit according to claim 5, wherein said pair of band elimination filters remove a low frequency component for preventing howling.

15. A sound signal changing circuit according to claim 5, wherein said switching circuit has a time delay.

* * * * *